United States Patent
Beck et al.

(10) Patent No.: US 12,089,198 B2
(45) Date of Patent: Sep. 10, 2024

(54) SYSTEMS AND METHODS FOR INCREASING CONTINUITY OF COMMUNICATIONS SERVICE

(71) Applicant: Outdoor Wireless Networks LLC, Claremont, NC (US)

(72) Inventors: Andrew E. Beck, Ashburn, VA (US); Christopher R. Hardy, Fairfax Stations, VA (US); Thomas Booker Gravely, Herndon, VA (US)

(73) Assignee: Outdoor Wireless Networks LLC, Claremont, NC (US)

( * ) Notice: Subject to any disclaimer, the term of this patent is extended or adjusted under 35 U.S.C. 154(b) by 328 days.

(21) Appl. No.: 17/677,534

(22) Filed: Feb. 22, 2022

(65) Prior Publication Data

US 2022/0322367 A1  Oct. 6, 2022

Related U.S. Application Data

(60) Provisional application No. 63/170,159, filed on Apr. 2, 2021.

(51) Int. Cl.
*H04W 72/12* (2023.01)
*H04W 16/14* (2009.01)

(52) U.S. Cl.
CPC .......... *H04W 72/12* (2013.01); *H04W 16/14* (2013.01)

(58) Field of Classification Search
None
See application file for complete search history.

(56) References Cited

U.S. PATENT DOCUMENTS

| | | | |
|---|---|---|---|
| 11,224,044 B1 * | 1/2022 | Hu | H04W 52/42 |
| 11,432,163 B2 * | 8/2022 | MacMullan | H04W 12/63 |
| 11,463,884 B2 | 10/2022 | Hannan et al. | |
| 11,907,900 B2 * | 2/2024 | Uchimura | G06Q 10/063114 |
| 2020/0162929 A1 * | 5/2020 | Cimpu | H04J 11/0026 |
| 2021/0103046 A1 * | 4/2021 | Waheed | G01S 7/023 |
| 2021/0385664 A1 | 12/2021 | Nguyen et al. | |
| 2022/0159658 A1 | 5/2022 | Hannan et al. | |
| 2022/0361184 A1 | 11/2022 | Beck | |

OTHER PUBLICATIONS

U.S. Patent and Trademark Office, "Restriction Requirement", U.S. Appl. No. 17/682,316, dated Apr. 5, 2024, pp. 1 through 5, Published: US.
U.S. Patent and Trademark Office, "Notice of Allowance", U.S. Appl. No. 17/682,316, dated May 1, 2024, pp. 1 through 13, Published: US.
Wireless Innovation Forum, CBRS Protocols Technical Report, Document WINNF-TR-0205, Version 1.0.0, Aug. 1, 2017, pp. Cover page through 32, (c) 2017 The Software Defined Radio Forum Inc.

(Continued)

*Primary Examiner* — Eunsook Choi
(74) *Attorney, Agent, or Firm* — Fogg & Powers LLC

(57) ABSTRACT

Techniques are provided for enhancing continuity in service of a radio authorized to transmit in shared spectrum by setting a transmit expiry time based upon whether the radio must cease transmission when a dynamic incumbent user operates in the dynamic protection area (DPA) to avoid aggregate interference to a receiver of the dynamic incumbent user, in or about the DPA, exceeding a threshold interference level.

30 Claims, 6 Drawing Sheets

(56) References Cited

OTHER PUBLICATIONS

Wireless Innovation Forum, "WINNF-TS-0112, Requirements for Commercial Operation in the U.S. 3550-3700 MHZ Citizens Broadband Radio Service Band" V1.4.1, Jan. 16, 2018, pp. Title Page through 69, (c) 2018 The Software Defined Radio Forum Inc.
Wireless Innovation Forum, WINNF-TS-0112, Requirements for Commercial Operation in the U.S. 3550-3700 MHZ Citizens Broadband Radio Service Band, V1.9.1, Mar. 11, 2020, pp. Title page through 76, (c) 2020 The Software Defined Radio Forum Inc.

* cited by examiner

SYSTEMS AND METHODS FOR INCREASING CONTINUITY OF COMMUNICATIONS SERVICE

CROSS-REFERENCE TO RELATED APPLICATIONS

The present application claims benefit of U.S. Patent Application Ser. No. 63/170,159 filed Apr. 2, 2021; the entire contents of the aforementioned patent application is incorporated herein by reference as if set forth in its entirety.

BACKGROUND

A citizens broadband radio service (CBRS) includes incumbent users of shared spectrum and secondary users of shared spectrum. An incumbent user may also be referred to as a primary user. Incumbent users have priority access to receive in the spectrum shared with the secondary users. If a secondary user seeks permission to transmit on spectrum shared by incumbent user(s) and/or other secondary user(s), the secondary user will only be permitted to do so to the extent its transmissions do not raise aggregate interference at the incumbent user(s) and/or other secondary user(s) above corresponding interference threshold levels for each of such incumbent user(s) and secondary user(s). One type of incumbent user, for example, is radar on naval ships or at fixed geographic location(s), e.g., on land; the radar receives signals in the shared spectrum. The fixed geographic location(s), e.g., on land, of the radar(s) may be known, and are represented as points. Geographic location(s) of the naval ship(s) with such radar are not known; geographic regions, e.g., of water, where the naval ships may be located are represented by dynamic protection areas (DPAs).

Secondary users use citizens broadband radio service device(s) (CBSD(s)). A CBSD is a radio including a transmitter coupled to an antenna. A CBRS system includes a spectrum access system (SAS) which regulates the transmissions of CBSD(s) in shared spectrum under the SAS's control, e.g., whether each CBSD controlled by a SAS can transmit in the shared spectrum, and if so, then at what power level, to ensure that aggregate interference at incumbent users and other CBSD(s), e.g., priority access licensee (PAL) CBSD(s), is within appropriate limits. The SAS also may include a function to coordinate the shared spectrum usage among secondary users that are General Authorized Access (GAA) CBSDs to diminish interference between GAA CBSDs and to regulate interference from GAA CBSD(s) at certain location(s), e.g., geographic location(s) of incumbent user(s), of protection area(s), and of exclusion zone(s). CBSDs are prohibited from operating in specific frequency spectrum in exclusion zones.

A requesting secondary user is a user requesting to transmit in shared spectrum controlled by a SAS and shared with incumbent user(s) and/or other secondary user(s) whose transmission(s) are controlled by the SAS. The SAS must authorize the requesting secondary user to transmit in the shared spectrum which is shared with incumbent user(s) and/or the other secondary user(s) controlled by the SAS. Such authorization is determined during spectrum coordination analysis. Planned spectrum coordination may be performed periodically or aperiodically. Planned spectrum coordination (or planned spectrum allocation) means, at a planned time, allocating a frequency spectrum and a maximum transmit power, in shared spectrum, to each of at least one GAA CBSD so that GAA CBSD(s), and incumbent user(s) (e.g., represented by protection points) if any, are free of interference (as that term is defined herein) from each of the at least one GAA CBSD. Optionally, maximum transmit power is effective isotropic radiated power or power spectral density radiated by antenna(s) of a CBSD. Coordinated Periodic Activities among SASs (CPAS) is an exemplary type of planned spectrum coordination used in CBRS.

During planned spectrum coordination, a SAS performs the following at planned times (e.g., once a day at a certain time): (a) receives a full activity dump (FAD) from other SASs, (b) determines whether the CBSD(s) who have requested to transmit in the shared spectrum can do so and at what maximum transmit power level, and (c) identifies which, if any, CBSD(s) should cease transmission should a dynamic incumbent user operate in a DPA and to avoid aggregate interference to a receiver of the incumbent user exceeding an interference threshold level. Operate means that the incumbent user is receiving in the shared spectrum. CBSD(s) identified to cease transmission when a dynamic incumbent operates in a DPA may be stored in a move list. Thus, the move list means a set of CBSD(s) geographically located within a neighborhood of the DPA whose transmissions in frequency spectrum must cease (e.g., at the command of a SAS) when a dynamic incumbent receives in the frequency spectrum and is geographically located in the DPA or a region adjacent to the DPA; termination of transmission of the set of CBSD(s) causes the DPA to be free of interference (as that term is defined herein) in the frequency spectrum in which the dynamic incumbent receives. Optionally, the move list is generated during the most recently performed planned spectrum allocation.

CBSD(s) authorized to transmit in shared spectrum communicate on an ongoing basis with the SAS, receiving a signal from the SAS indicating that the CBSD(s) can continue to transmit in the shared spectrum; such a signal may be referred to herein as a heartbeat signal. If a radar is determined to be operating in a DPA, certain CBSD(s) receive a communication from the SAS to cease transmitting so as not to interfere with the radar of the naval ship.

In the event communications between a CBSD and the SAS is disrupted so that the CBSD cannot receive the communication from the SAS to cease transmitting, the heartbeat signal includes a transmit expiry time (or expiry time). Conventionally, the expiry time is a future time of day that is a current time of day plus a short (or shorter) time period, e.g., two hundred and forty seconds from the current time of day. The heartbeat signal specifies the expiry time. This prevents the CBSD from inadvertently transmitting and potentially adversely interfering with a dynamic incumbent user(s) in DPA(s).

Communications between a CBSD and the SAS may be disrupted by issues in a network comprising the RAN, e.g., faulty firewall and/or router setting(s) or failure, a failure in a SAS such that the SAS does not send the heartbeat signal, and/or a failure in the communications link communicatively coupling the SAS to the CBSD, e.g., Internet. As a result of such disruption, the CBSD does not receive the heartbeat signal by the expiry time, and the CBSD is no longer authorized to transmit. Transmissions from the CBSD must cease quickly, e.g., within sixty second after the expiry time has passed and when no successive heartbeat signal has been received by the CBSD. Often, many CBSDs must contemporaneously cease transmitting due to a failure of each CBSD to receive a heartbeat signal. The inability of the CBSD(s) to transmit, e.g., to user equipment, in shared spectrum due to a failure of each CBSD to receive a heartbeat signal creates an undesirable continuity in service issue for operator(s) of the CBSD(s).

SUMMARY OF THE INVENTION

A method is provided for establishing a transmit expiry time for a radio authorized to transmit in a shared spectrum. The method comprises: determining a distance from the radio to a point of a dynamic protection area (DPA); establishing the transmit expiry time based at least in part on the determined distance; and sending the transmit expiry time to the radio.

A program product comprises a non-transitory processor readable medium on which program instructions are embodied, wherein the program instructions are configured, when executed by at least one programmable processor, to cause the at least one programmable processor to execute a method of determining a transmit expiry time of a radio authorized to transmit in a shared spectrum. The method comprises: determining a distance from the radio to a point of a dynamic protection area (DPA); establishing the transmit expiry time based at least in part on the determined distance; and sending the transmit expiry time to the radio.

A system is configured to establish a transmit expiry time for a radio authorized to transmit in a shared spectrum. The system comprises: a communications system; and processing circuitry communicatively coupled to the communications system and configured to: determine a distance from the radio to a point of a dynamic protection area (DPA); establish a transmit expiry time based at least in part on the determined distance; and send the transmit expiry time to the radio.

DRAWINGS

Comprehension of embodiments of the invention is facilitated by reading the following detailed description in conjunction with the annexed drawings, in which.

DETAILED DESCRIPTION

Figure 1:
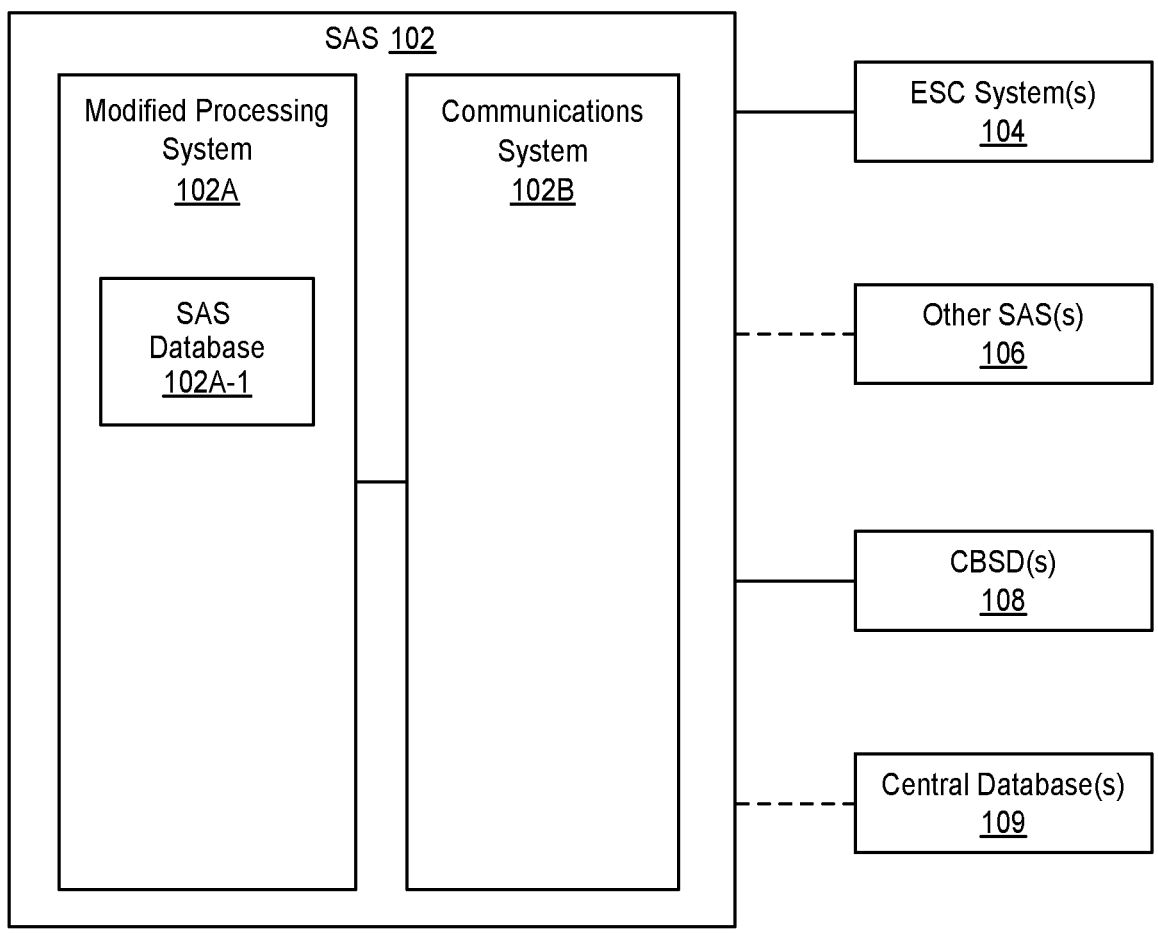
FIG. 1 illustrates a block diagram of one embodiment of a shared spectrum system configured to perform spectrum allocation at a planned time using a modified spectrum coordination system.

Embodiments of an invention provide techniques for diminishing a disruption of continuity of service of CBSD(s). Optionally, CBSD(s) that are located in a neighborhood of a DPA, or a subset of the CBSD(s), are sent an expiry time that is a shorter or earlier time value (so that if no heartbeat is received by one of the CBSD(s) from a SAS during the shorter or earlier time value, then the CBSD should cease transmitting in shared spectrum). The transmit expiry time (or expiry time) means a time of day or a time value which if during which the CBSD does not receive a subsequent heartbeat signal prior to the time of day or prior to expiry of the time value then the CBSD must cease transmitting in the shared spectrum within a certain time value respectively after the time of day or expiry of the time value; optionally, the certain time value may be zero or sixty seconds. Optionally, the subset comprises at least one of: (a) CBSD(s) identified, during planned spectrum coordination, to cease transmission should a dynamic incumbent user operate in or in a region adjacent to a DPA and (b) CBSD(s) authorized (e.g., by a SAS) to transmit (in shared spectrum) in frequency spectrum co-channel with frequency spectrum in which a dynamic incumbent user, who is geographically located in, or a region adjacent to, the DPA, is configured to receive. With respect to (b), the CBSD(s) may be authorized to transmit in the shared spectrum during planned or unplanned spectrum allocation.

Other CBSD(s) are sent an expiry time that is a longer or later time value (so that if no heartbeat is received by one of the CBSD(s) from a SAS during the longer or later time value, the CBSD should cease transmitting in shared spectrum). Optionally, earlier time of day or the shorter or earlier time value is respectively a time that is two hundred and forty seconds from the current time of day or two hundred and forty seconds. Optionally, the later or longer time value is respectively a time of the next planned spectrum allocation or a time remaining, with respect to the current time of day, until the next planned spectrum allocation—which may be measured in hours, rather than in seconds, from the current time of day with respect to the shorter or earlier time value. The longer time value is longer in time than the shorter time value. The later time value is later in time than the earlier time value. Optionally, the expiry time is sent in a heartbeat signal from the SAS. Optionally, the heartbeat signal is sent in response to a heartbeat request signal sent from a CBSD to the SAS.

Because many CBSDs are located outside of DPAs or are authorized to transmit in frequency spectrum co-channel with frequency spectrum in which a dynamic incumbent user, who is geographically located in, or a region adjacent to, the DPA, is configured to receive, many CBSDs will receive the longer or later time value instead of the shorter or earlier time value. The longer or later time value provides operators more time to correct disruptions in communications between CBSD(s) and the SAS. Thus, the number of CBSDs susceptible to continuity in service disruptions, and thus the number of continuities in service disruptions, are diminished.

Although embodiments of the invention are applicable to and may be exemplified in the context of CBRS for pedagogical purposes, the embodiments are applicable to other shared spectrum systems, such as for example licensed spectrum access systems or authorized access systems. Thus, for example, embodiments of the invention can be subsequently described in more general terms, e.g., using the term radio rather than CBSD, and shared spectrum system rather than CBRS. However, the terms CBRS and CBSD may be subsequently used when illustrating such a shared spectrum system and a device. Thus, a CBSD may be more generally referred to as a radio. Radio means a radio whose transmission is controlled or regulated by a spectrum access system which may also be referred to as a spectrum management system or a spectrum coordination system.

Shared spectrum (or shared frequency spectrum) means frequency spectrum utilized by: (a) incumbent user(s) (e.g., a receiver of a fixed satellite service (FSS)) and/or geographic region(s) to be maintained interference free (e.g., a grandfather wireless protection zone (GWPZ), a priority access license (PAL) protection area (PPA), a geographic location of an environmental sensing capability (ESC) system receiver(s), a government communications field office, and/or an exclusion zone) and at least one of (b) priority access licensee (PAL) CBSD(s) and GAA CBSD(s). Each of GWPZ(s) and geographic location(s) of an environmental sensing capability (ESC) system receiver(s) may be collectively referred to as a protection point area. A CBSD may be a GAA or a PAL CBSD.

A dynamic incumbent (or dynamic incumbent user) means an incumbent user that is represented by at least one DPA in which the dynamic incumbent user intermittently (i.e., non-continuously) receives. Thus, a receiver in a DPA does not need to be continuously, or constantly, interference free (as that term is defined herein). A dynamic incumbent illustrated herein for pedagogical purposes as a radar and particularly a radar receiver; however, dynamic incumbent user represented by a DPA may be a receiver of any type of communications system that non-continuously receives in the DPA. A dynamic incumbent user may be permanently or transitorily located in the DPA.

A static incumbent (or static incumbent user) means an incumbent user whose receiver must be always, i.e., continuously, free of interference. Static incumbent users are typically located at a fixed location and comprise FSS(s), PPA(s), GWPZ(s), government communications field offices (e.g., Federal Communications Commission field office), and any other type of static incumbent user.

Free of interference as used herein does not mean an absence of interference, but rather means an acceptable level of interference (i.e., a level of interference below a threshold level of interference) which may be no interference or a finite level of interference; thus, to determine if a geographic location, e.g., of an incumbent user or a geographic region to be maintained interference free, is free of interference, whether the interference level is below the acceptable level of interference (or a threshold level of interference) is determined. Optionally, threshold levels mentioned herein may be set by a system designer and/or a system user. The acceptable level of interference may vary by the type of incumbent user or geographic region, frequency spectrum, and/or other indicia.

Co-existence data includes information about (a) incumbent user(s), (b) geographic region(s) to be maintained interference free, (c) PAL CBSD(s), and/or (d) GAA CBSD(s), including each's corresponding geographic location, authorized frequency spectrum, interference threshold level, and/or interference margin (e.g., for an incumbent user configured to receive in the shared spectrum); the co-existence data further includes data about each CBSD (including data indicative of maximum capable transmit power, CBSD group information[1], and/or any parameters of the CBSD's used to perform propagation modelling such as for example antenna radiation pattern and/or antenna height). Optionally, co-existence data only includes data about (a) incumbent user(s) and/or (b) geographic region(s) each of which is to be maintained interference free and which have neighborhood(s) that encompass the geographic location of a CBSD.

[1] CBSD group means (a) a group of CBSDs whose interference is managed by a network operator so that no edge need be created between two nodes comprising such CBSDs and/or (b) for a fixed wireless access GAA CBSDs, a base station CBSD and consumer premises equipment configured to communicate with the base station CBSD.

Frequency spectrum means a bandwidth centered about a center frequency. Co-channel means frequency spectrum equal to or a subset of another frequency spectrum. Unless otherwise indicated herein, power as used herein means power or power spectral density. Power levels for a shared spectrum system, such as a CBRS, are often characterized in terms of power spectral density levels.

A CBRS system comprises general authorized access (GAA) and/or priority access licensee (PAL) CBSDs, and incumbent user(s) and geographic region(s) to be maintained interference free. The incumbent users have priority access, with respect to secondary users such as GAA CBSDs, to, e.g., receive in, some or all of spectrum in the shared spectrum. A SAS grants the CBSDs permission to transmit in the shared spectrum, including authorizing frequency spectrum (or channels) requested by CBSDs, and authorizing a corresponding requested maximum transmission power or assigning a lower maximum transmission power. The SAS controls the transmission of GAA CBSDs so that PAL CBSDs and the incumbent users are free of interference from GAA CBSDs. The GAA and PAL CBSDs are secondary users; the PAL CBSDs are secondary users because they have a lower priority than the incumbent users. For example, PAL and GAA CBSDs must protect Environmental Sensing Capability (ESC) sensors which are used to detect radar transmissions, e.g., from naval ships, in the CBRS frequency spectrum. The SAS is configured to control the transmission of PAL and GAA CBSDs so that incumbent users are free of interference from PAL and GAA CBSDs.

GAA CBSDs may be of two types: category A (low transmission power) and category B (high transmission power). Category A has a maximum transmission power spectral density of 30 dBm/10 MHz. Category B has a maximum transmission power spectral density of 47 dBm/10 MHz. Other categories may be utilized with corresponding different maximum transmission power spectral densities.

Incumbent users of shared spectrum have first, or highest, priority to utilize the shared spectrum controlled by the SAS. Thus, incumbent users (e.g., the receivers of incumbent users' communications systems such as radios) shall be able to operate free of interference from other users, e.g., communications systems of priority access licensees and general authorized access users. Communications systems, as used herein, shall include Environmental Sensing Capability (ESC) receivers and satellite ground stations.

In one embodiment, PAL CBSDs have second (or intermediate) priority, after incumbent users (which excludes PAL CBSDs), to utilize the shared spectrum. Optionally, a PAL CBSD shall be able to transmit when incumbent users and geographic region(s) to be maintained interference free are free of interference when the PAL CBSD transmits.

GAA CBSDs have a third, or lowest, priority to utilize the frequency spectrum. Optionally, operation of GAA and PAL CBSDs are be governed by laws, regulations, and/or rules (e.g., pertaining to CBRS). Such laws, regulations, and/or rules may be established by government(s) and/or standards bodies (e.g., Wireless Innovation Forum or WInnForum). Optionally, a GAA CBSD shall be able to transmit when incumbent users and geographic region(s) to be maintained interference free are free of interference when the GAA CBSD transmits.

FIG. 1 illustrates a block diagram of one embodiment of a shared spectrum system 100 configured to perform spectrum allocation at a planned time using a modified spectrum coordination system. The planned time is when planned spectrum coordination is performed. The shared spectrum system 100 comprises a SAS 102 communicatively coupled to at least one CBSD (CBSD(s)) 108 whose transmissions are controlled or regulated by the SAS 102. Subject to satisfying interference requirement, a SAS is configured to grant a CBSD access to the shared spectrum, including authorizing frequency spectrum (or channels) requested by the CBSD, and authorizing a corresponding maximum transmission power requested by the CBSD or assigning a maximum transmission power lower than the maximum transmission power requested by the CBSD. Each CBSD is operated by a general authorized access user and/or a priority access licensee.

Optionally, the SAS 102 is coupled to at least one environmental sensing capability system (ESC system(s)) 104. Optionally, the SAS 102 is coupled to at least one central database (central database(s)) 109, e.g., which has information about (a) incumbent user(s) and/or (b) geographic region(s) to be maintained interference free (e.g., type, interference threshold power level, location, information about neighborhood, and/or when certain incumbent user(s) and/or geographic region(s) to be maintained interference free are scheduled to include a communications system, e.g., a radar, that will receive in the shared spectrum.

Optionally, the SAS 102 is coupled to at least one other SAS (other SAS(s)) 106. The other SAS(s) 106 are configured to control the transmissions of other CBSD(s) (in the same shared spectrum in which the CBSD(s) 108 transmit or in overlapping frequency spectrum) and where the other CBSD(s) are geographically proximate to the CBSD(s) 108. For example, such other CBSDs controlled by other SAS(s) 106 may include PAL and GAA users.

The SAS 102 is configured to perform interference analysis and authorize transmission by CBSD(s) 108 in the shared spectrum. CBSD(s) (whose transmissions are controlled by other SAS(s) 106) may generate electromagnetic energy that overlaps the geographic region and frequency spectrum of the CBSD(s) 108 controlled by SAS 102, and thus must be accounted for by the SAS 102 when the SAS 102 performs interference analysis and authorizes transmission by CBSD(s) 108 in the shared spectrum. Alternatively, the shared spectrum system 100 and its PALs and GAA CBSDs, may generate electromagnetic energy that overlaps the geographic region of the other SAS(s) 106, and thus must be accounted for by the other SAS(s) 106 when the other SAS(s) 106 perform interference analysis, and authorize operation of PALs and GAA CBSDs (whose transmissions are controlled by the other SAS(s) 106). By coupling SASs whose CBSDs are geographically proximate to one another, each SAS can account for electromagnetic energy emitted from proximate CBSD(s) in those geographies.

Each ESC system detects, and communicates to the SAS 102, the presence of signal(s), e.g., from dynamic incumbent(s), such as radars, in DPA(s). Thus, the SAS 102 is configured to receive information about the presence and/or operation of dynamic incumbent(s), e.g., radar, receiving in shared spectrum in DPA(s). Alternatively, dynamic incumbent(s), including those operating in a DPA, can inform the SAS 102 that they are operating, e.g., by transmitting a signal beacon, or communicating with the central database(s) 109 communicatively coupled to the SAS 102; thus, additionally or alternatively, the central database(s) 109 may convey that dynamic incumbent(s) are intermittently receiving in DPA(s). The SAS 102 is configured send a heartbeat signal to the CBSD(s) 108.

The SAS 102 also is configured to control transmission (e.g., power levels and frequencies of operation) of the GAA user(s)' CBSD(s) so that the PAL CBSD(s) operate free of interference. In one embodiment, the SAS 102 includes a modified processing system 102A coupled to a communications system (or communications system circuitry) 102B. The modified processing system 102A is configured to perform or cause to perform, at least in part, the operations described herein performed by the SAS 102, and to further determine whether an expiry time should be a shorter or earlier time value or a longer or later time value.

The communications system 102B facilitates communications between the SAS 102 and other systems or devices, e.g., the CBSD(s) 108, the ESC system(s) 104, the central database(s) 109, and/or the other SAS(s) 106. In one embodiment, the communications system 102B includes a modem, e.g., an Internet data modem, a transceiver, and/or any other communications device(s) that can facilitate communications between the aforementioned devices. The communications system 102B is configured to send the heartbeat signal(s) to the CBSD(s) 108.

Optionally, the modified processing system (or modified processing system circuitry) 102A may be a state machine, a neural network, and/or a quantum computer. If the modified processing system 102A includes a state machine, then optionally the state machine may comprise processor circuitry coupled to memory circuitry.

The SAS 102, e.g., the modified processing system 102A, comprises a SAS database 102A-1 and is configured to perform planned spectrum coordination. Optionally, the SAS 102, e.g., the modified processing system 102A, is configured to perform unplanned spectrum coordination which determines whether a requesting CBSD can transmit in shared spectrum prior to a next planned spectrum coordination. Optionally, the functionality of the SAS 102, e.g., the modified processing system 102A, may be implemented by software stored in the memory circuitry and executed by the processor circuitry, and the SAS database 102A-2 comprises data stored in the memory circuitry and processed by the processor circuitry. The components of the SAS 102 are provided for illustrative purposes only; other component(s) may be instead of those illustrated in FIG. 1.

The conventional spectrum coordination system is configured to determine frequency spectrum to allocate to CBSD(s) (registered with a SAS 102 and/or other SAS(s) 106) that ensure that if the CBSD(s) request the frequency spectrum allocation recommended by the SAS 102 and/or the other SAS(s) 106, then the CBSD(s) will be free from interference. Conventional planned spectrum coordination system also determines the maximum transmission power of CBSDs so that protection regions(s) and/or protection point(s) (which represent actual and/or potential incumbent user(s) and/or regions which are to remain free of interference from CBSDs) will be free of interference. The conventional planned spectrum coordination system does so by assessing aggregate interference at each protection point and/or protection region having a neighborhood encompassing geographic location(s) of CBSD(s), where the aggregate interference is generated by such CBSD(s) in the neighborhood. Neighborhood means a geographic area (such as a circle or other shape) around all or a portion of a region (e.g., a fixed distance from a closest point in the region) or centered around a protection point, e.g., which optionally is defined by a radius or other geometric description.

Protection points may correspond to different types of incumbent users. An interference threshold level for a protection point may depend on a type of incumbent user that the protection point represents. Interference threshold levels may vary amongst incumbent user types.

Optionally, determination of maximum transmission power may be implemented with power allocation process that operates substantially accordingly to WInnForum CBRS general requirement R2-SGN-16 and using an iterative allocation process (TAP). WInnForum general requirement (requirement) R2-SGN-16 of WINNF-TS-0112 defines the IAP, and WINNF-TS-0112 is incorporated by reference herein in its entirety. The IAP determines maximum transmit power levels by allocating interference margin fairly to CBSDs in neighborhood(s) of protection point(s) proximate to the CBSDs. The IAP determines such transmit power levels by allocating interference margin fairly to the CBSDs in neighborhoods of protection areas and/or protection point(s) of incumbent(s) for a certain combination or set of frequency spectrums mapped to the CBSDs. WInnForum general requirement (requirement) R2-SGN-16 of WINNF-TS-0112 defines the IAP and is incorporated by reference herein in its entirety. However, the power allocation system may be implemented in other ways to allocate, e.g., equitably, maximum transmission power of CBSDs.

The SAS 102, e.g., the modified processing system 102A, is configured to model interference between two geographic points using at least one propagation model. Propagation model(s) may be used to determine path loss between to geographic points; knowing a transmit power of a CBSD in the shared spectrum, the path loss may then be used to determine a power (transmitted from the CBSD) at a geographic location (e.g., at another CBSD or a protection point) remote from the CBSD. Optionally, the SAS 102, e.g., the modified processing system 102A, includes one, two, or more propagation models one of which may be selected based upon geographic morphology (e.g., topography) between two geographic points. The propagation model(s) may include a free space path loss model, an irregular terrain model and/or a Hata model (or variation(s) thereof such as the enhanced Hata (eHata) model). The propagation model(s) may be utilized to determine interference power transmitted from a CBSD at a geographic location remote from the CBSD.

The SAS 102, e.g., the modified processing system 102A, also includes techniques for generating a neighborhood around each protection point and can propagation model(s) to determine the aggregate level of interference, at each protection point and/or each protection region, in frequency spectra at each protection point and/or each protection region from CBSD(s) in the neighborhood of a corresponding protection point and/or a corresponding protection region. To this end, the propagation model(s) (e.g., free space path loss model, irregular terrain model, and/or Hata model (or variations thereof such as the enhanced Hata (eHata) model)) are used to determine path loss between CBSDs and protection point(s) and/or protection region(s).

The SAS database 102A-2 includes information about the CBSD(s) 108 and CBSDs (geographically proximate to the CBSD(s) 108) whose transmissions in some or all of the shared spectrum are controlled by other SAS(s) 106. Optionally, such CBSD information may store all or part of the co-existence data, e.g., including CBSD type (and thus maximum transmit power) and/or maximum transmit power, geographic location, antenna height, antenna gain, antenna pattern, antenna down tilt angle, and/or antenna azimuthal angle. The SAS database 102A-2 also includes information about the location of incumbent users, e.g., of DPA(s), proximate to the CBSD(s) 108. Additionally, and/or alternatively, the SAS 102, e.g., the modified processing system 102A is configured to remotely obtain such information, e.g., from the central database(s) 109, the other SAS(s) 106 (e.g., from a full activity dump (FAD) from each of the other SAS(s) 106 to the SAS 102), and/or the corresponding CBSD(s). Optionally, the SAS database 102A-1 may include geographic morphology data about the geographic region where CBSDs, whose transmission is controlled by the SAS 102 and optionally by other SAS(s) 106, are located. Optionally, the modified processing system 102A is configured to receive the geographic morphology data, e.g., from the central database(s) 109. Optionally, SAS database 102A-1 is configured to store some or all of the data received from the central database(s) 109.

Figure 2:
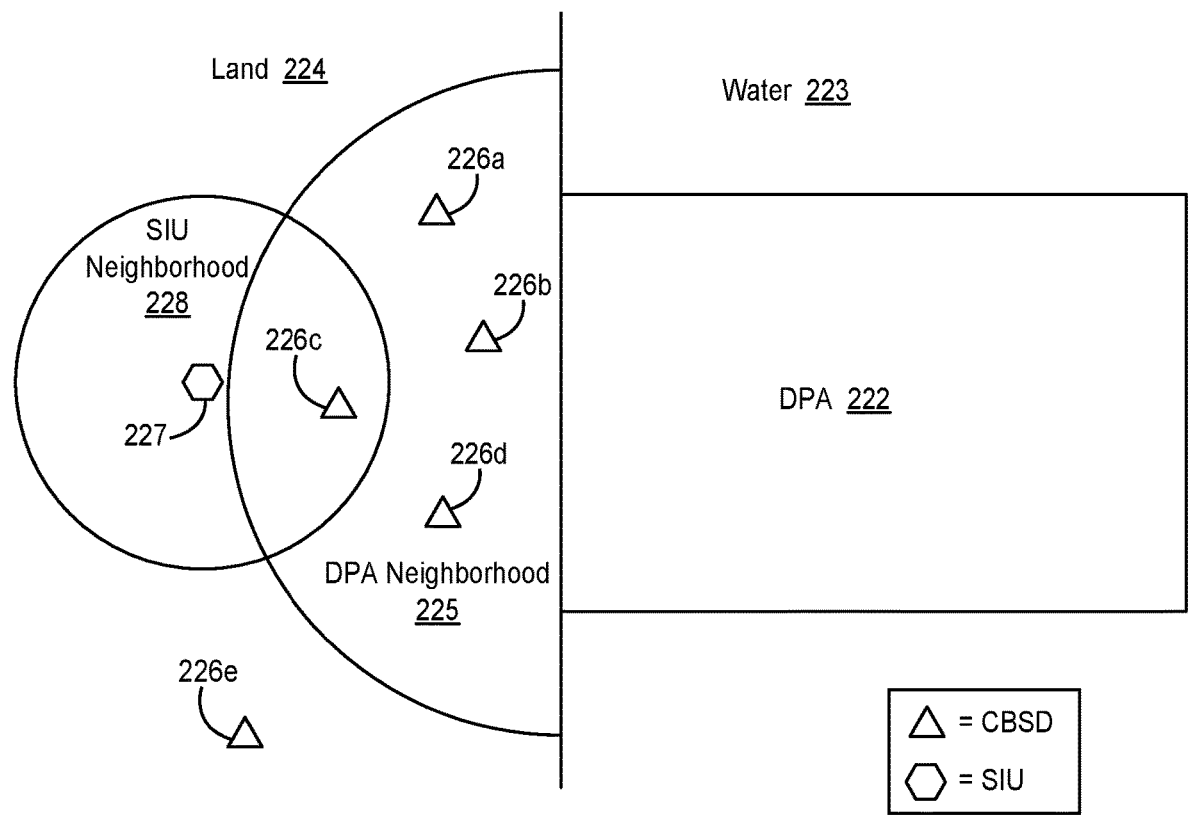
FIG. 2 illustrates a diagram of one embodiment of a dynamic protection area.

FIG. 2 illustrates a diagram of one embodiment of a dynamic protection area (DPA) 222. For pedagogical purposes, the DPA 222 is illustrated as being geographically located in water 223, e.g., where a naval ship, would be located. However, a DPA may be geographically located on land 224 and/or water 223. For pedagogical purposes, CBSDs 226a-226e are illustrated as being geographically located on land 224. However, CBSD(s) may be located on land 224 and/or water 223. CBSDs 226a-226d are illustrated as being geographically located within a neighborhood 225 of the DPA 222. CBSD 226e is illustrated as being geographically located outside of the neighborhood of the DPA 222. Optionally, the neighborhood 225—of a DPA 222 in water 223—comprises only land 224. A static incumbent user (SIU) 227 and a neighborhood 228 of the static incumbent user are also illustrated. The static incumbent user is illustrated as being geographically located on land 224. CBSD 226c is geographically located within the SIU neighborhood 228 and the DPA neighborhood 225.

Figure 3:
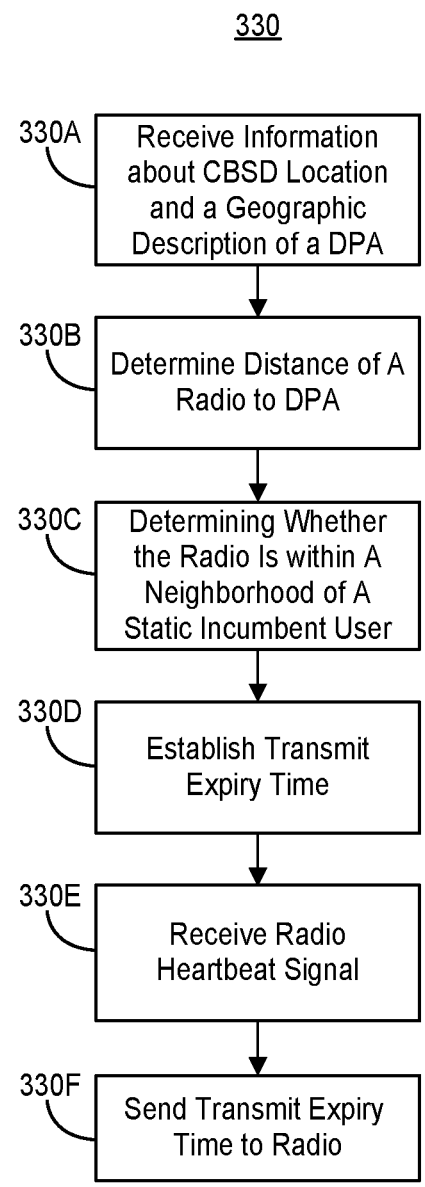
FIG. 3 illustrates one embodiment of a method of determining a transmit expiry time of a citizens broadband radio service device based upon at least geographic location of the citizens broadband radio service device.

FIG. 3 illustrates one embodiment of a method 330 of determining a transmit expiry time of a CBSD based upon at least geographic location of the CBSD. To the extent that the methods shown in Figures herein are described herein as being implemented with any of the systems illustrated herein, it is to be understood that other embodiments can be implemented in other ways. Optionally, the methods subsequently described may be implemented by a SAS, e.g., the processing system of the SAS. The blocks of the flow diagrams have been arranged in a generally sequential manner for ease of explanation; however, it is to be understood that this arrangement is merely exemplary, and it should be recognized that the processing associated with the methods (and the blocks shown in the FIG. 3) can occur in a different order (for example, where at least some of the processing associated with the blocks is performed in parallel and/or in an event-driven manner).

Optionally, in block 330A, information, about (a) a location of a CBSD authorized to transmit in shared spectrum and (b) a geographic description of a DPA, is received. Optionally, such information is received when co-existence data is received. Optionally, the CBSD is authorized to transmit in the shared spectrum after the most recently performed planned spectrum allocation. Optionally, the CBSD is a CBSD authorized to transmit in a frequency spectrum that is coincident with or overlaps the frequency spectrum in which a dynamic incumbent user in the DPA is configured to receive. Optionally, the received information further includes at least one of: a geographic description of a neighborhood of the DPA, a geographic description of a static incumbent user, a geographic description of a neighborhood of the static incumbent user, and a move list.

In block 330B, a distance, from the CBSD to a point of the DPA, is determined. Optionally, the point is a nearest point of the DPA to the CBSD. Optionally, distance determination between the CBSD to the DPA further comprises determining whether the CBSD is within a neighborhood of the DPA. Optionally, distance determination between the CBSD to the DPA further comprises determining whether the CBSD is specified in a move list. Optionally, in block 330C, whether the CBSD is within a neighborhood of a static incumbent user is determined.

In block 330D, a transmit expiry time is established for the CBSD based at least in part upon the determined distance. Optionally, establishing the transmit expiry time comprises setting the transmit expiry time to a first value if the CBSD is determined to be geographically located within a neighborhood of the DPA and setting the transmit expiry time to a second value if the CBSD is determined not to be geographically located within the neighborhood of the DPA, where the second value is greater or later than the first value. Optionally, establishing the transmit expiry time comprises setting the transmit expiry time to a first value if the CBSD is determined to be geographically located within the neighborhood of the DPA, setting the transmit expiry time to a second value if the CBSD is determined not to be geographically located within a neighborhood of the DPA and is also determined to be geographically located within the neighborhood of a static incumbent user, and setting the transmit expiry time to a third value if the CBSD is determined not to be geographically located within the neighborhood of the DPA and is also determined not to be geographically located within a neighborhood of the static incumbent user; where the third value is greater or later than the second value, and the second value is greater or later than the first value. Optionally, establishing the transmit expiry time comprises setting the transmit expiry time to a first value if the CBSD is specified in the move list and setting the transmit expiry time to a second value if the CBSD is not specified in the move list, where the second value is greater or later than the first value. Optionally, establishing the transmit expiry time comprises setting the transmit expiry time to a first value if the CBSD is determined to be specified in the move list, setting the transmit expiry time to a second value if the CBSD is determined not to be specified in the move list and is also determined to be geographically located within a neighborhood of the static incumbent user, and setting the transmit expiry time to a third value if the CBSD is determined not to be specified in the move list and is also determined not to be geographically located within a neighborhood of the static incumbent user, where the third value is greater or later than the second value, and the second value is greater or later than the first value. Optionally, the first value equals a time of day equal to two hundred and forty seconds plus the current time of day or two hundred and forty seconds. Optionally, the second value equals a time of a next planned spectrum allocation or a time from a current time of day to the next planned spectrum allocation. Optionally, the third value is greater or later than a time of a next planned spectrum allocation or a time from a current time of day to the next planned spectrum allocation, e.g., twenty four hours.

Optionally, in block 330E, a CBSD heartbeat signal is received from the CBSD prior to transmitting the transmit expiry time to the CBSD. In block 330F, a transmit expiry time is sent to the CBSD. Optionally, such transmission may be repeated periodically or aperiodically. Optionally, such transmission may be part of a heartbeat signal sent by the SAS to the CBSD.

If within the transmit expiry time, the CBSD does not receive instructions to continue to transmit in the shared spectrum in the form of another, e.g., heartbeat, signal, then the CBSD must cease transmitting in authorized frequency spectrum in the shared spectrum within a certain time value, e.g., within sixty seconds after the transmit expiry time. If such instructions are timely received, then the CBSD may continue to transmit until at least the end of the latest received transmit expiry time.

Figure 4:
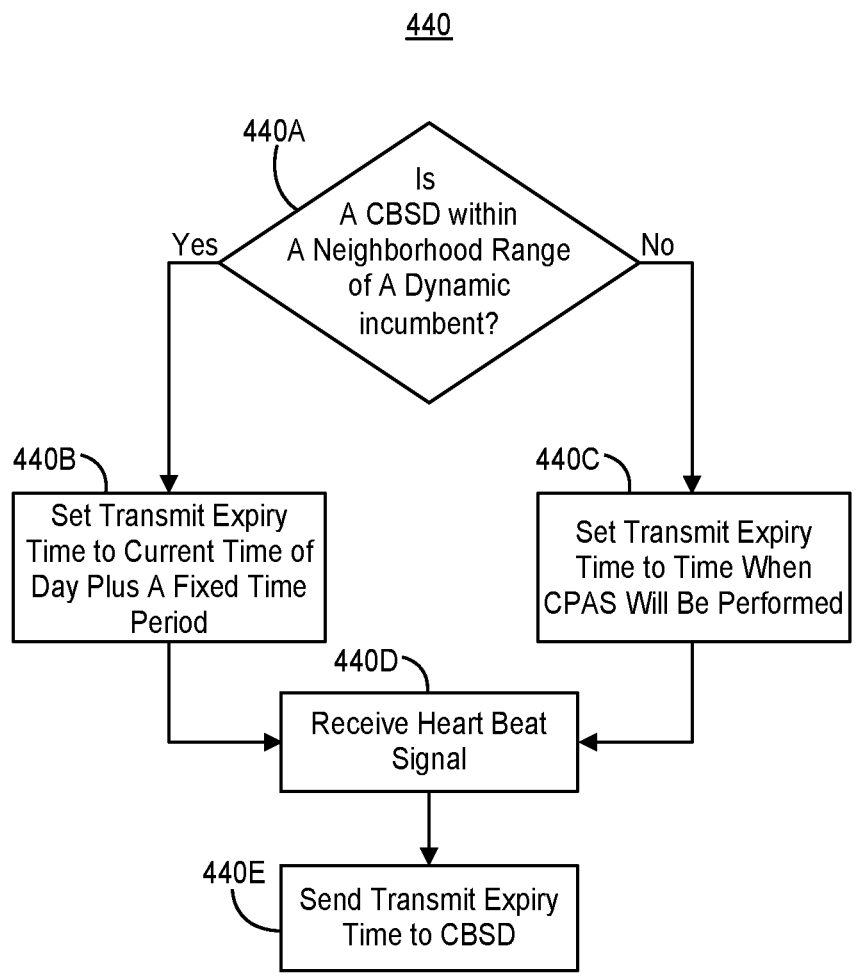
FIG. 4 illustrates another embodiment of a method of determining a transmit expiry time of a CBSD based upon at least geographic location of the CBSD.

FIG. 4 illustrates another embodiment of a method 440 of determining a transmit expiry time of a CBSD based upon at least geographic location of the CBSD. Determination of transmit expiry time of the CBSD is determined based upon whether the CBSD is within a neighborhood range of a dynamic incumbent, e.g., is within a neighborhood of a protection point of a dynamic protection area (DPA).

In block 440A, whether a CBSD is within a neighborhood range of a dynamic incumbent is determined. Optionally, block 440A is implemented by determining whether a CBSD is within a neighborhood of a protection point of a DPA.

If the CBSD is within a neighborhood range of a dynamic incumbent (or is within a neighborhood of a protection point of the DPA), then, in block 440B, a transmit expiry time for the CBSD is set to current time of day plus a time period less than a fixed time period (e.g., defined by law, regulation, or specification) by which the CBSD must cease transmission in frequency spectrum in which the dynamic incumbent receives after the SAS (which controls the CBSD's transmission) receives information that dynamic incumbent is utilizing the frequency spectrum. Optionally, the fixed time period is less than the three hundred seconds, e.g., two hundred and forty seconds. If the CBSD is not within a neighborhood range of a dynamic incumbent (or is not within a neighborhood of a protection point of the DPA), then, in block 440C, the transmit expiry time for the CBSD is set to a time when the CPAS will be, e.g., next, performed, e.g., by a SAS which controls the transmission of the CBSD. Thus, a CBSD which does not impact (e.g., is not deemed to cause interference to) a dynamic incumbent[2] can continue to operate during a communications outage between the CBSD and the SAS which controls the transmission of the CBSD.

[2] E.g., because the CBSD is outside of neighborhood(s) of protection point(s) of DPA(s).

After each of blocks 440B and 440C, optionally proceed to optional block 440D or 440E. In optional block 440D, a CBSD heartbeat signal is received from the CBSD prior to transmitting the transmit expiry time to the CBSD. In optional block 440E, a transmit expiry time is sent to the CBSD. Optionally, such transmission may be repeated periodically or aperiodically. Optionally, such transmission may be part of a heartbeat signal sent by the SAS to the CBSD.

If within the transmit expiry time, the CBSD does not receive instructions to continue to transmit in the shared spectrum in the form of another, e.g., heartbeat, signal, then the CBSD must cease transmitting in authorized frequency spectrum in the shared spectrum within a certain time value, e.g., within sixty seconds after the transmit expiry time. If such instructions are timely received, then the CBSD may continue to transmit until at least the end of the latest received transmit expiry time.

Figure 5:
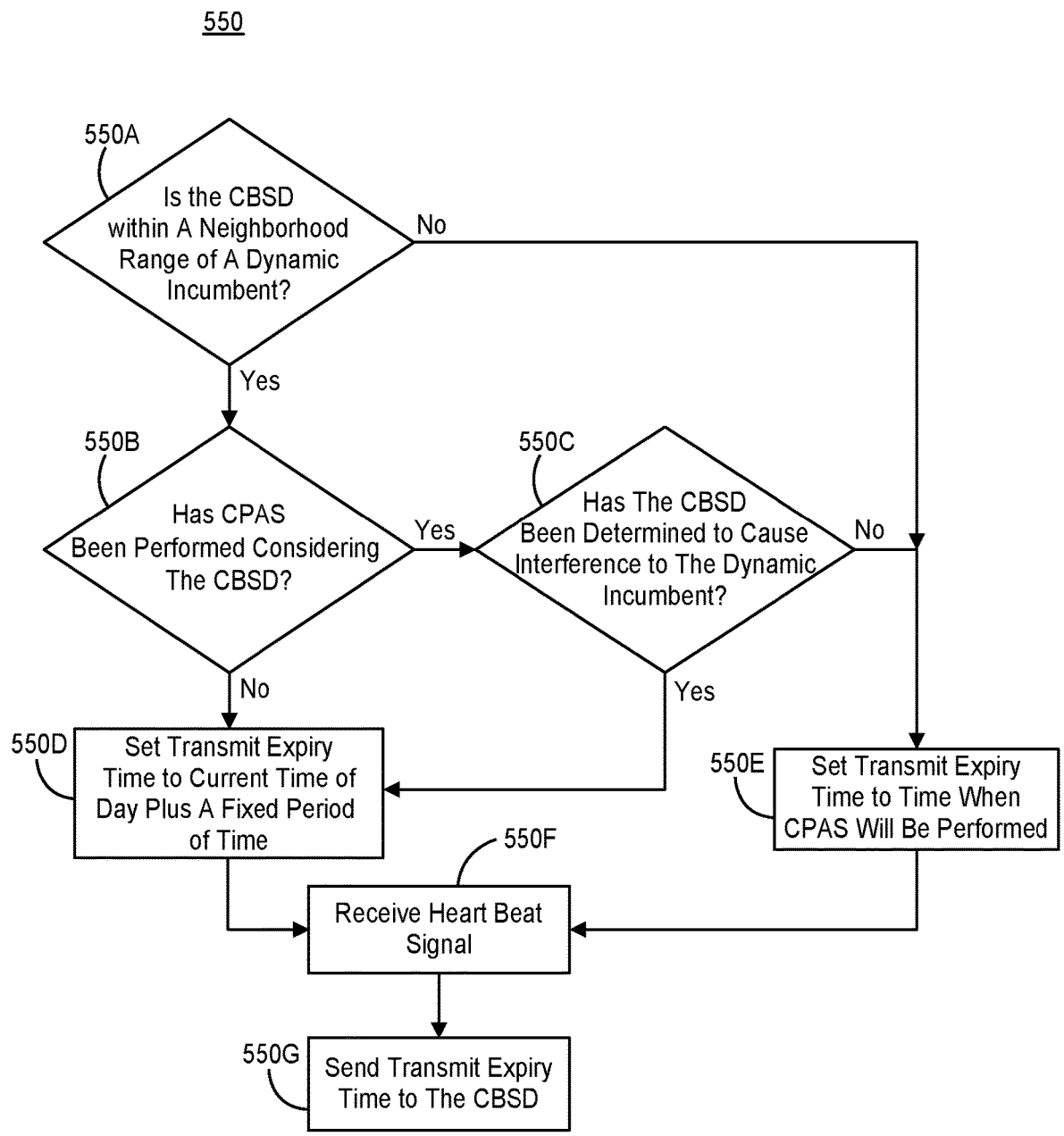
FIG. 5 illustrates a further embodiment of a method of determining a transmit expiry time of a CBSD based upon at least geographic location of the CBSD.

FIG. 5 illustrates a further embodiment of a method 550 of determining a transmit expiry time of a CBSD based upon at least geographic location of the CBSD. Determination of transmit expiry time of the CBSD is determined based upon whether the CBSD is within a neighborhood range of a dynamic incumbent, e.g., is within a neighborhood of a protection point of a DPA, whether CPAS has been performed considering the CBSD, and whether the CBSD was determined to interfere with the dynamic incumbent, e.g., at least one protection point of a DPA.

In block 550A, whether a CBSD is within a neighborhood range of a dynamic incumbent is determined. Optionally, block 550A is implemented by determining whether a CBSD is within a neighborhood of a protection point of a DPA.

If the CBSD is not within a neighborhood range of a dynamic incumbent (or is not within a neighborhood of a protection point of the DPA), then proceed to block 550E. If the CBSD is within a neighborhood range of a dynamic incumbent (or is within a neighborhood of a protection point of the DPA), then, in block 550B, determine whether a CPAS has been performed considering the CBSD, e.g., by the SAS which controls transmission of the CBSD.

If the CPAS has not been performed including for the CBSD, then in block 550D a transmit expiry time is set to a current time of day plus a time period less than a fixed time period (e.g., defined by law, regulation, or specification) by which the CBSD must cease transmission in frequency spectrum in which the dynamic incumbent receives after the SAS (which controls the CBSD's transmission) receives information that dynamic incumbent is utilizing the frequency spectrum. Optionally, the fixed time period is less than three hundred seconds, e.g., two hundred and forty seconds. If CPAS has not been performed considering the CBSD, then proceed to block 550D.

If the CPAS has been performed including for the CBSD, then in block 550C determine whether the CBSD has been determined to cause interference to the dynamic incumbent (or has an interference contribution at a protection point of the DPA that exceeds an interference threshold level). If the CBSD has been determined to cause interference to the dynamic incumbent (or has an interference contribution at a protection point of the DPA that exceeds an interference threshold level), then proceed to block 550D. if the CBSD has been determined not to cause interference to the dynamic incumbent (or has an interference contribution at a protection point of the DPA that does not exceed an interference threshold level), then in block 550E set the transmit expiry time to a time when CPAS will be, e.g., next, performed, e.g., by a SAS which controls the transmission of the CBSD. Optionally, after block 550D and/or after block 550E, proceed to optional block 550F or 550G.

In optional block 550F, a CBSD heartbeat signal is received from the CBSD prior to transmitting the transmit expiry time to the CBSD. In optional block 550G, the transmit expiry time is sent to the CBSD. Optionally, such transmission may be repeated periodically or aperiodically. Optionally, such transmission may be part of a heartbeat signal sent by the SAS to the CBSD.

If within the transmit expiry time, the CBSD does not receive instructions to continue to transmit in the shared spectrum in the form of another, e.g., heartbeat, signal, then the CBSD must cease transmitting in authorized frequency spectrum in the shared spectrum within a certain time value, e.g., within sixty seconds after the transmit expiry time. If such instructions are timely received, then the CBSD may continue to transmit until at least the end of the latest received transmit expiry time.

Figure 6:
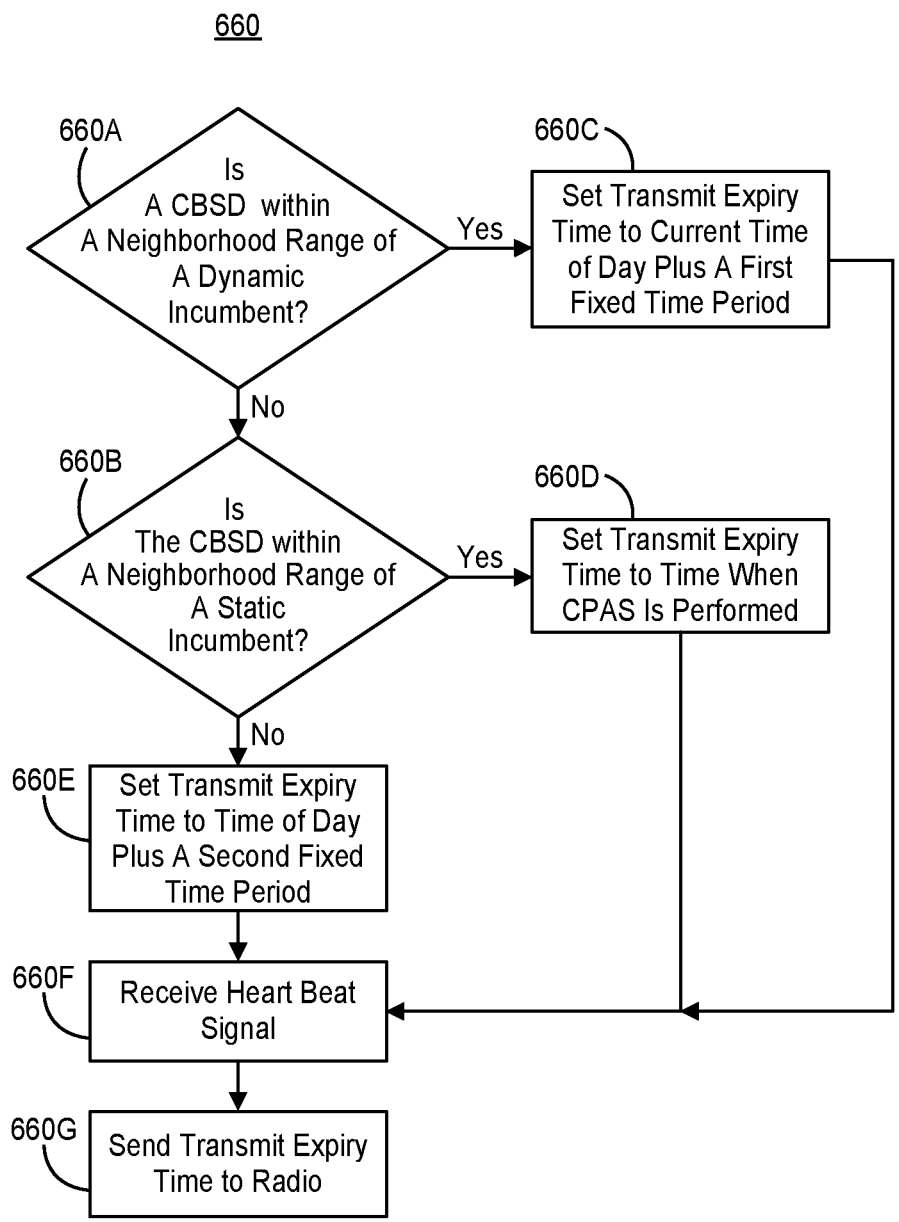
FIG. 6 illustrates yet another embodiment of a method of determining a transmit expiry time of a CBSD based upon at least geographic location of the CBSD.

FIG. 6 illustrates yet another embodiment of a method 660 of determining a transmit expiry time of a CBSD based upon at least geographic location of the CBSD. Determination of transmit expiry time of the CBSD is determined based upon whether the CBSD is within a neighborhood range of a dynamic incumbent, e.g., is within a neighborhood of a protection point of a DPA, or within a neighborhood range of a static incumbent, e.g., is within a neighborhood of a protection point representing a geographic location of a static incumbent).

In block 660A, whether a CBSD is within a neighborhood range of a dynamic incumbent is determined. Optionally, block 660A is implemented by determining whether a CBSD is within a neighborhood of a protection point of a DPA. If the CBSD is not within a neighborhood range of a dynamic incumbent (or is not within a neighborhood of a protection point of the DPA), then in block 660B determine whether the CBSD is within a neighborhood range of a static incumbent (or is within a neighborhood of a protection point representing a geographic location of the static incumbent).

If the CBSD is within a neighborhood range of a dynamic incumbent (or is within a neighborhood of a protection point of the DPA), then then in block 660C a transmit expiry time is set to a current time of day plus a time period less than a first fixed time period (e.g., defined by law, regulation, or specification) by which the CBSD must cease transmission in frequency spectrum in which the dynamic incumbent receives after the SAS (which controls the CBSD's transmission) receives information that dynamic incumbent is utilizing the frequency spectrum. Optionally, the fixed time period is less than three hundred seconds, e.g., two hundred and forty seconds. Optionally, after block 660C proceed to optional blocks 660F or block 660G.

If the CBSD is within a neighborhood range of the static incumbent (or is within a neighborhood of a protection point representing a geographic location of the static incumbent), then, in block 660D, set the transmit expiry time to a time of day when CPAS will be, e.g. next, performed, e.g., by a SAS which controls the transmission of the CBSD. The second fixed time period is a much longer time period than the first fixed time period and may be for example twenty four hours. Optionally, the second time period is set by law, regulation, specification, or an operator of a SAS performing method 660. Optionally, the second time period is twenty four hours. Thus, a CBSD which does not impact (e.g., is not deemed to cause interference to) a dynamic incumbent[3] can continue to operate during a communications outage between the CBSD and the SAS which controls the transmission of the CBSD. Optionally, after block 660D proceed to optional blocks 660F or block 660G.

[3] E.g., because the CBSD is outside of neighborhood(s) of protection point(s) of a DPA(s).

If the CBSD is not within a neighborhood range of the static incumbent (or is not within a neighborhood of a protection point representing a geographic location of the static incumbent), then, in block 660E, set the transmit expiry time to a time of day plus a second fixed time period. The second fixed time period is a much longer time period than the first fixed time period and may be for example twenty four hours. Optionally, the second time period is set by law, regulation, specification, or an operator of a SAS performing method 660. Optionally, the second time period is twenty four hours. Thus, a CBSD which does not impact (e.g., is not deemed to cause interference to) a dynamic incumbent and a static incumbent[4] can continue to operate during a communications outage between the CBSD and the SAS which controls the transmission of the CBSD. Optionally, after block 660E proceed to optional blocks 660F or block 660G.

[4] E.g., because the CBSD is outside of neighborhood(s) of protection point(s) of a DPA(s) and outside neighborhood(s) of static incumbent(s).

In optional block 660F, a CBSD heartbeat signal is received from the CBSD prior to transmitting the transmit expiry time to the CBSD. In optional block 660G, the transmit expiry time is sent to the CBSD. Optionally, such transmission may be repeated periodically or aperiodically. Optionally, such transmission may be part of a heartbeat signal sent by the SAS to the CBSD.

If within the transmit expiry time, the CBSD does not receive instructions to continue to transmit in the shared spectrum in the form of another, e.g., heartbeat, signal, then the CBSD must cease transmitting in authorized frequency spectrum in the shared spectrum within a certain time value, e.g., within sixty seconds after the transmit expiry time. If such instructions are timely received, then the CBSD may continue to transmit until at least the end of the latest received transmit expiry time.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of embodiments of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

Exemplary Embodiments

Example 1 includes a method for establishing a transmit expiry time for a radio authorized to transmit in a shared spectrum, the method comprising: determining a distance from the radio to a point of a dynamic protection area (DPA); establishing the transmit expiry time based at least in part on the determined distance; and sending the transmit expiry time to the radio.

Example 2 includes the method of Example 1, wherein determining the distance further comprises determining whether the radio is within a neighborhood of the DPA; wherein establishing the transmit expiry time comprises: setting the transmit expiry time to a first value if the radio is determined to be geographically located within a neighborhood of the DPA; and setting the transmit expiry time to a second value if the radio is determined not to be geographically located within the neighborhood of the DPA; wherein the second value is greater or later than the first value.

Example 3 includes the method of any of Examples 1-2, further comprising determining whether the radio is within a neighborhood of a static incumbent user; and wherein determining the distance further comprises determining whether the radio is within a neighborhood of the DPA; wherein establishing the transmit expiry time comprises: setting the transmit expiry time to a first value if the radio is determined to be geographically located within the neighborhood of the DPA; setting the transmit expiry time to a second value if the radio is determined not to be geographically located within a neighborhood of the DPA and is also determined to be geographically located within the neighborhood of a static incumbent user; and setting the transmit expiry time to a third value if the radio is determined not to be geographically located within the neighborhood of the DPA and is also determined not to be geographically located within a neighborhood of the static incumbent user; wherein the third value is greater or later than the second value, and the second value is greater or later than the first value.

Example 4 includes the method of any of Examples 2 or 3, wherein the second value is equal to a time of day of a next planned spectrum allocation or a time from a current time of day to the next planned spectrum allocation.

Example 5 includes the method of any of Examples 1-4, further comprising receiving a radio heartbeat signal from the radio prior to transmitting the transmit expiry time to the radio.

Example 6 includes the method of any of Examples 1-5, further comprising receiving at least one of a geographic location of the radio and information describing a neighborhood of the DPA.

Example 7 includes the method of Example 6, further comprising receiving information describing a neighborhood of a static incumbent user.

Example 8 includes the method of any of Examples 1-7, wherein determining the distance further comprises determining whether the radio is specified in a move list; wherein establishing the transmit expiry time comprises: setting the transmit expiry time to a first value if the radio is specified in the move list; and setting the transmit expiry time to a second value if the radio is not specified in the move list; wherein the second value is greater or later than the first value.

Example 9 includes the method of any of Examples 1-8, further comprising determining whether the radio is within a neighborhood of a static incumbent user; and wherein determining the distance further comprises determining whether the radio is specified in a move list; wherein establishing the transmit expiry time comprises: setting the transmit expiry time to a first value if the radio is determined to be specified in the move list; setting the transmit expiry time to a second value if the radio is determined not to be specified in the move list and is also determined to be geographically located within a neighborhood of the static incumbent user; and setting the transmit expiry time to a third value if the radio is determined not to be specified in the move list and is also determined not to be geographically located within a neighborhood of the static incumbent user; wherein the third value is greater or later than the second value, and the second value is greater or later than the first value.

Example 10 includes a program product comprising a non-transitory processor readable medium on which program instructions are embodied, wherein the program instructions are configured, when executed by at least one programmable processor, to cause the at least one programmable processor to execute a method of determining a transmit expiry time of a radio authorized to transmit in a shared spectrum, the method comprising: determining a distance from the radio to a point of a dynamic protection area (DPA); establishing the transmit expiry time based at least in part on the determined distance; and sending the transmit expiry time to the radio.

Example 11 includes the program product of Example 10, wherein determining the distance further comprises determining whether the radio is within a neighborhood of the DPA; wherein establishing the transmit expiry time comprises: setting the transmit expiry time to a first value if the radio is determined to be geographically located within a neighborhood of the DPA; and setting the transmit expiry time to a second value if the radio is determined not to be geographically located within the neighborhood of the DPA; wherein the second value is greater or later than the first value.

Example 12 includes the program product of any of Examples 10-11, wherein the method further comprises determining whether the radio is within a neighborhood of a static incumbent user; and wherein determining the distance further comprises determining whether the radio is within a neighborhood of the DPA; wherein establishing the transmit expiry time comprises: setting the transmit expiry time to a first value if the radio is determined to be geographically located within the neighborhood of the DPA; setting the transmit expiry time to a second value if the radio is determined not to be geographically located within a neighborhood of the DPA and is also determined to be geographically located within the neighborhood of a static incumbent user; and setting the transmit expiry time to a third value if the radio is determined not to be geographically located within the neighborhood of the DPA and is also determined not to be geographically located within a neighborhood of the static incumbent user; wherein the third value is greater or later than the second value, and the second value is greater or later than the first value.

Example 13 includes the program product of any of Examples 11 or 12, wherein the second value is equal to a time of day of a next planned spectrum allocation or a time from a current time of day to the next planned spectrum allocation.

Example 14 includes the program product of any of Examples 10-13, wherein the method further comprises receiving a radio heartbeat signal from the radio prior to transmitting the transmit expiry time to the radio.

Example 15 includes the program product of any of Examples 10-14, wherein the method further comprises receiving at least one of a geographic location of the radio and information describing a neighborhood of the DPA.

Example 16 includes the program product of Example 15, wherein the method further comprises receiving information describing a neighborhood of a static incumbent user.

Example 17 includes the program product of any of Examples 10-16, wherein determining the distance further comprises determining whether the radio is specified in a move list; wherein establishing the transmit expiry time comprises: setting the transmit expiry time to a first value if the radio is specified in the move list; and setting the transmit expiry time to a second value if the radio is not specified in the move list; wherein the second value is greater or later than the first value.

Example 18 includes the program product of any of Examples 10-17, wherein the method further comprises determining whether the radio is within a neighborhood of a static incumbent user; and wherein determining the distance further comprises determining whether the radio is specified in a move list; wherein establishing the transmit expiry time comprises: setting the transmit expiry time to a first value if the radio is determined to be specified in the move list; setting the transmit expiry time to a second value if the radio is determined not to be specified in the move list and is also determined to be geographically located within a neighborhood of the static incumbent user; and setting the transmit expiry time to a third value if the radio is determined not to be specified in the move list and is also determined not to be geographically located within a neighborhood of the static incumbent user; wherein the third value is greater or later than the second value, and the second value is greater or later than the first value.

Example 19 includes a system configured to establish a transmit expiry time for a radio authorized to transmit in a shared spectrum, comprising: a communications system; and processing circuitry communicatively coupled to the communications system and configured to: determine a distance from the radio to a point of a dynamic protection area (DPA); establish a transmit expiry time based at least in part on the determined distance; and send the transmit expiry time to the radio.

Example 20 includes the system of Example 19, wherein determining the distance further comprises determining whether the radio is within a neighborhood of the DPA; wherein establishing the transmit expiry time comprises: set the transmit expiry time to a first value if the radio is determined to be geographically located within a neighborhood of the DPA; and set the transmit expiry time to a second value if the radio is determined not to be geographically located within the neighborhood of the DPA; wherein the second value is greater or later than the first value.

Example 21 includes the system of any of Examples 19-20, wherein the processing circuitry is further configured to determine whether the radio is within a neighborhood of a static incumbent user; and wherein determining the distance further comprises determine whether the radio is within a neighborhood of the DPA; wherein establishing the transmit expiry time comprises: set the transmit expiry time to a first value if the radio is determined to be geographically located within the neighborhood of the DPA; set the transmit expiry time to a second value if the radio is determined not to be geographically located within a neighborhood of the DPA and is also determined to be geographically located within the neighborhood of a static incumbent user; and set the transmit expiry time to a third value if the radio is determined not to be geographically located within the neighborhood of the DPA and is also determined not to be geographically located within a neighborhood of the static incumbent user; wherein the third value is greater or later than the second value, and the second value is greater or later than the first value.

Example 22 includes the system of any of Examples 20 or 21, wherein the second value is equal to a time of day of a next planned spectrum allocation or a time from a current time of day to the next planned spectrum allocation.

Example 23 includes the system of any of Examples 19-22, wherein the processing circuitry is further configured to receive a radio heartbeat signal from the radio prior to transmitting the transmit expiry time to the radio.

Example 24 includes the system of any of Examples 19-23, wherein the processing circuitry is further configured to receive at least one of a geographic location of the radio and information describing a neighborhood of the DPA.

Example 25 includes the system of Example 24, wherein the processing circuitry is further configured to receive information describing a neighborhood of a static incumbent user.

Example 26 includes the system of any of Examples 19-25, wherein determining the distance further comprises determine whether the radio is specified in a move list; wherein establishing the transmit expiry time comprises: set the transmit expiry time to a first value if the radio is specified in the move list; and set the transmit expiry time to a second value if the radio is not specified in the move list; wherein the second value is greater or later than the first value.

Example 27 includes the system of any of Examples 19-26, wherein the processing circuitry is further configured to determine whether the radio is within a neighborhood of a static incumbent user; and wherein determining the distance further comprises determine whether the radio is specified in a move list; wherein establishing the transmit expiry time comprises: set the transmit expiry time to a first value if the radio is determined to be specified in the move list; set the transmit expiry time to a second value if the radio is determined not to be specified in the move list and is also determined to be geographically located within a neighborhood of the static incumbent user; and set the transmit expiry time to a third value if the radio is determined not to be specified in the move list and is also determined not to be geographically located within a neighborhood of the static incumbent user; wherein the third value is greater or later than the second value, and the second value is greater or later than the first value.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method for establishing a transmit expiry time for a radio authorized to transmit in a shared spectrum, the method comprising:
   determining a distance from the radio to a point of a dynamic protection area (DPA);
   establishing the transmit expiry time based at least in part on the determined distance; and
   sending the transmit expiry time to the radio.

2. The method of claim 1, wherein determining the distance further comprises determining whether the radio is within a neighborhood of the DPA;
   wherein establishing the transmit expiry time comprises:
      setting the transmit expiry time to a first value if the radio is determined to be geographically located within a neighborhood of the DPA; and
      setting the transmit expiry time to a second value if the radio is determined not to be geographically located within the neighborhood of the DPA;
   wherein the second value is greater or later than the first value.

3. The method of claim 2, wherein the second value is equal to a time of day of a next planned spectrum allocation or a time from a current time of day to the next planned spectrum allocation.

4. The method of claim 1, further comprising determining whether the radio is within a neighborhood of a static incumbent user; and
   wherein determining the distance further comprises determining whether the radio is within a neighborhood of the DPA;
   wherein establishing the transmit expiry time comprises:
      setting the transmit expiry time to a first value if the radio is determined to be geographically located within the neighborhood of the DPA;
      setting the transmit expiry time to a second value if the radio is determined not to be geographically located within a neighborhood of the DPA and is also determined to be geographically located within the neighborhood of a static incumbent user; and
      setting the transmit expiry time to a third value if the radio is determined not to be geographically located within the neighborhood of the DPA and is also determined not to be geographically located within a neighborhood of the static incumbent user;
      wherein the third value is greater or later than the second value, and the second value is greater or later than the first value.

5. The method of claim 3, wherein the second value is equal to a time of day of a next planned spectrum allocation or a time from a current time of day to the next planned spectrum allocation.

6. The method of claim 1, further comprising receiving a radio heartbeat signal from the radio prior to transmitting the transmit expiry time to the radio.

7. The method of claim 1, further comprising receiving at least one of a geographic location of the radio and information describing a neighborhood of the DPA.

8. The method of claim 6, further comprising receiving information describing a neighborhood of a static incumbent user.

9. The method of claim 1, wherein determining the distance further comprises determining whether the radio is specified in a move list;
   wherein establishing the transmit expiry time comprises:
      setting the transmit expiry time to a first value if the radio is specified in the move list; and
      setting the transmit expiry time to a second value if the radio is not specified in the move list;
      wherein the second value is greater or later than the first value.

10. The method of claim 1, further comprising determining whether the radio is within a neighborhood of a static incumbent user; and
    wherein determining the distance further comprises determining whether the radio is specified in a move list;
    wherein establishing the transmit expiry time comprises:
       setting the transmit expiry time to a first value if the radio is determined to be specified in the move list;
       setting the transmit expiry time to a second value if the radio is determined not to be specified in the move list and is also determined to be geographically located within a neighborhood of the static incumbent user; and
       setting the transmit expiry time to a third value if the radio is determined not to be specified in the move list and is also determined not to be geographically located within a neighborhood of the static incumbent user;
       wherein the third value is greater or later than the second value, and the second value is greater or later than the first value.

11. A program product comprising a non-transitory processor readable medium on which program instructions are embodied, wherein the program instructions are configured, when executed by at least one programmable processor, to cause the at least one programmable processor to execute a method of determining a transmit expiry time of a radio authorized to transmit in a shared spectrum, the method comprising:
    determining a distance from the radio to a point of a dynamic protection area (DPA);
    establishing the transmit expiry time based at least in part on the determined distance; and
    sending the transmit expiry time to the radio.

12. The program product of claim 11, wherein determining the distance further comprises determining whether the radio is within a neighborhood of the DPA;
    wherein establishing the transmit expiry time comprises:
        setting the transmit expiry time to a first value if the radio is determined to be geographically located within a neighborhood of the DPA; and
        setting the transmit expiry time to a second value if the radio is determined not to be geographically located within the neighborhood of the DPA;
    wherein the second value is greater or later than the first value.

13. The program product of claim 12, wherein the second value is equal to a time of day of a next planned spectrum allocation or a time from a current time of day to the next planned spectrum allocation.

14. The program product of claim 11, wherein the method further comprises determining whether the radio is within a neighborhood of a static incumbent user; and
    wherein determining the distance further comprises determining whether the radio is within a neighborhood of the DPA;
    wherein establishing the transmit expiry time comprises:
        setting the transmit expiry time to a first value if the radio is determined to be geographically located within the neighborhood of the DPA;
        setting the transmit expiry time to a second value if the radio is determined not to be geographically located within a neighborhood of the DPA and is also determined to be geographically located within the neighborhood of a static incumbent user; and
        setting the transmit expiry time to a third value if the radio is determined not to be geographically located within the neighborhood of the DPA and is also determined not to be geographically located within a neighborhood of the static incumbent user;
    wherein the third value is greater or later than the second value, and the second value is greater or later than the first value.

15. The program product of claim 14, wherein the second value is equal to a time of day of a next planned spectrum allocation or a time from a current time of day to the next planned spectrum allocation.

16. The program product of claim 11, wherein the method further comprises receiving a radio heartbeat signal from the radio prior to transmitting the transmit expiry time to the radio.

17. The program product of claim 11, wherein the method further comprises receiving at least one of a geographic location of the radio and information describing a neighborhood of the DPA.

18. The program product of claim 17, wherein the method further comprises receiving information describing a neighborhood of a static incumbent user.

19. The program product of claim 11, wherein determining the distance further comprises determining whether the radio is specified in a move list;
    wherein establishing the transmit expiry time comprises:
        setting the transmit expiry time to a first value if the radio is specified in the move list; and
        setting the transmit expiry time to a second value if the radio is not specified in the move list;
    wherein the second value is greater or later than the first value.

20. The program product of claim 11, wherein the method further comprises determining whether the radio is within a neighborhood of a static incumbent user; and
    wherein determining the distance further comprises determining whether the radio is specified in a move list;
    wherein establishing the transmit expiry time comprises:
        setting the transmit expiry time to a first value if the radio is determined to be specified in the move list;
        setting the transmit expiry time to a second value if the radio is determined not to be specified in the move list and is also determined to be geographically located within a neighborhood of the static incumbent user; and
        setting the transmit expiry time to a third value if the radio is determined not to be specified in the move list and is also determined not to be geographically located within a neighborhood of the static incumbent user;
    wherein the third value is greater or later than the second value, and the second value is greater or later than the first value.

21. A system configured to establish a transmit expiry time for a radio authorized to transmit in a shared spectrum, comprising:
    a communications system; and
    processing circuitry communicatively coupled to the communications system and configured to:
        determine a distance from the radio to a point of a dynamic protection area (DPA);
        establish a transmit expiry time based at least in part on the determined distance; and
        send the transmit expiry time to the radio.

22. The system of claim 21, wherein determining the distance further comprises determining whether the radio is within a neighborhood of the DPA;
    wherein establishing the transmit expiry time comprises:
        set the transmit expiry time to a first value if the radio is determined to be geographically located within a neighborhood of the DPA; and
        set the transmit expiry time to a second value if the radio is determined not to be geographically located within the neighborhood of the DPA;
    wherein the second value is greater or later than the first value.

23. The system of claim 22, wherein the second value is equal to a time of day of a next planned spectrum allocation or a time from a current time of day to the next planned spectrum allocation.

24. The system of claim 21, wherein the processing circuitry is further configured to determine whether the radio is within a neighborhood of a static incumbent user; and
    wherein determining the distance further comprises determine whether the radio is within a neighborhood of the DPA;
    wherein establishing the transmit expiry time comprises:
        set the transmit expiry time to a first value if the radio is determined to be geographically located within the neighborhood of the DPA;
        set the transmit expiry time to a second value if the radio is determined not to be geographically located within a neighborhood of the DPA and is also determined to be geographically located within the neighborhood of a static incumbent user; and set the transmit expiry time to a third value if the radio is determined not to be geographically located within the neighborhood of the DPA and is also determined not to be geographically located within a neighborhood of the static incumbent user;

wherein the third value is greater or later than the second value, and the second value is greater or later than the first value.

25. The system of claim 24, wherein the second value is equal to a time of day of a next planned spectrum allocation or a time from a current time of day to the next planned spectrum allocation.

26. The system of claim 21, wherein the processing circuitry is further configured to receive a radio heartbeat signal from the radio prior to transmitting the transmit expiry time to the radio.

27. The system of claim 21, wherein the processing circuitry is further configured to receive at least one of a geographic location of the radio and information describing a neighborhood of the DPA.

28. The system of claim 27, wherein the processing circuitry is further configured to receive information describing a neighborhood of a static incumbent user.

29. The system of claim 21, wherein determining the distance further comprises determine whether the radio is specified in a move list;

wherein establishing the transmit expiry time comprises:
set the transmit expiry time to a first value if the radio is specified in the move list; and
set the transmit expiry time to a second value if the radio is not specified in the move list;
wherein the second value is greater or later than the first value.

30. The system of claim 21, wherein the processing circuitry is further configured to determine whether the radio is within a neighborhood of a static incumbent user; and wherein determining the distance further comprises determine whether the radio is specified in a move list;

wherein establishing the transmit expiry time comprises:
set the transmit expiry time to a first value if the radio is determined to be specified in the move list;
set the transmit expiry time to a second value if the radio is determined not to be specified in the move list and is also determined to be geographically located within a neighborhood of the static incumbent user; and
set the transmit expiry time to a third value if the radio is determined not to be specified in the move list and is also determined not to be geographically located within a neighborhood of the static incumbent user;
wherein the third value is greater or later than the second value, and the second value is greater or later than the first value.

\* \* \* \* \*